United States Patent [19]

Messura et al.

[11] Patent Number: 4,832,915
[45] Date of Patent: May 23, 1989

[54] VAPOR RECOVERY FROM PARTICLES CONTAINING SAME

[75] Inventors: Kathleen A. Messura, Aiken, S.C.; Charles A. Ayres, Bartlesville, Okla.

[73] Assignee: Phillips Petroleum Company, Bartlesville, Okla.

[21] Appl. No.: 682,467

[22] Filed: Dec. 17, 1984

Related U.S. Application Data

[62] Division of Ser. No. 495,541, May 17, 1983, Pat. No. 4,499,263.

[51] Int. Cl.$^4$ .................. B01J 4/00; B01J 8/12
[52] U.S. Cl. ................... 422/62; 422/109; 422/111; 422/134; 422/233; 422/193
[58] Field of Search ............. 34/36, 47, 48, 50, 168, 34/169, 228; 422/62, 190, 191, 134, 109, 111, 193, 233; 528/483, 497, 498

[56] References Cited

U.S. PATENT DOCUMENTS

| | | | |
|---|---|---|---|
| 2,561,420 | 7/1951 | Schutte | 422/191 X |
| 2,701,758 | 2/1955 | Danulat et al. | 422/190 X |
| 2,772,216 | 11/1956 | Elliott | 422/190 X |
| 2,964,513 | 12/1960 | Dale | 528/483 X |
| 3,190,867 | 6/1965 | Oldweiler et al. | 528/483 X |
| 3,279,087 | 10/1966 | Hearne et al. | 34/12 |
| 3,318,804 | 5/1967 | Van Pool et al. | 208/365 |
| 3,612,144 | 10/1971 | Marcum et al. | 159/48 |
| 3,622,553 | 11/1971 | Cines | 260/92.8 |
| 3,734,400 | 5/1973 | Pfeiffer et al. | 233/11 |
| 3,869,807 | 3/1975 | Perry | 34/33 |

FOREIGN PATENT DOCUMENTS

309385 of 1918 Fed. Rep. of Germany ......... 34/47

OTHER PUBLICATIONS

McCabe et al., Unit Operations of Chemical Engineering, 1956, p. 772.

*Primary Examiner*—Michael S. Marcus
*Attorney, Agent, or Firm*—Williams, Phillips & Umphlett

[57] ABSTRACT

A system for recovering vapor, such as residual isobutane, from powder, such as polyethylene powder, comprises surge vessel and a two-compartment purge column. The polymer passes through the surge vessel by means of valves such as ball valves on the inlet and outlet of the surge vessel. Hot vapor, such as isobutane, is used to strip a large portion of the residual isobutane from the polyethylene in the top section of the purge column. Part of the isobutane leaving the column goes to a hydrocarbon recovery section and part is heated and recycled as the stripping medium. In the bottom section, nitrogen is used to strip the remaining isobutane from the polymer. An analyzer controller sensing nitrogen in the isobutane stream to recovery controls pressure in the bottom section by manipulating a valve in the nitrogen off-gas line form the bottom section to control the nitrogen content of the isobutane stream being recycled as stripping medium.

9 Claims, 1 Drawing Sheet

VAPOR RECOVERY FROM PARTICLES CONTAINING SAME

This application is a division of pending application Ser. No. 495,541, filed May 17, 1983 now U.S. Pat. No. 4,499,263.

This invention relates to a method for separating vapor from solid particles containing same. In another aspect, the invention relates to a method and apparatus for separating vaporous diluent or solvent from solid polymer particles.

In many polymerization processes for the production of normally solid polymer, a stream is formed which is a slurry of the particulate polymer suspended in a liquid medium, ordinarily the reaction diluent. For example, in the polymerization of ethylene in a hydrocarbon diluent under controlled conditions of temperature and pressure, a slurry of nonagglomerating solids and diluent can be formed. This process is called particle form polymerization. In this process, or other processes in which the polymer is prepared in solution and subsequently precipitated upon the slurry, there is a problem of separating the solid polymer from the liquid diluent. A convenient method to carry out the separation is by flashing the hydrocarbon into a vapor by reducing the pressure on the slurry. However, this method does not ordinarily affect complete removal of the hydrocarbon from the polymer and the remaining solids retain residual amounts of diluent which must be removed before the polymer can be handled in the atmosphere with safety. This is particularly important to prevent explosion when the polymer is to be subsequently transferred by pneumatic conveying means.

OBJECTS OF THE INVENTION

It is an object of this invention to provide method and apparatus for separating vapor from particles which contain the vapor.

It is another object of the invention to provide method and apparatus for the drying of particles such as polymer particles containing residual or adherent diluent or solvent.

Yet another object of this invention is to provide method and apparatus for transferring solids containing residual diluent to a pneumatic polymer transfer line.

SUMMARY OF THE INVENTION

According to certain aspects of the present invention, there is provided an apparatus comprising of substantially enclosed first chamber, a means for introducing particulate material into an upper portion of the substantially enclosed first chamber from a higher pressure zone while preventing pressurization of said substantially enclosed first chamber to the higher pressure. A sparger is positioned in a lower portion of the substantially enclosed first chamber. A conduit means is connected to the upper portion of the substantially enclosed first chamber and establishes a path to the sparger. A substantially enclosed second chamber is associated with the substantially enclosed first chamber in such a manner so that it can receive particulate material by gravity feed from the first chamber. A second sparger is positioned in a lower portion of the substantially enclosed second chamber. A vapor outlet is connected to an upper portion of the substantially enclosed second chamber. A means for metering particulate material from a lower portion of the substantially enclosed second chamber is also provided.

In another aspect of the present invention, there is provided a process comprising introducing polymer particles containing a first amount of diluent or solvent into a first zone. A first mixture of inert gas and diluent or solvent vapor at a first temperature is introduced into the first zone to evaporate a first portion of the diluent or solvent from the polymer particles. From the first zone, there is withdrawn a second mixture of inert gas and diluent or solvent vapor. A first portion of this second mixture is recycled to the first zone. Polymer particles containing a second amount of diluent or solvent are withdrawn from the first zone and introduced into a second zone. In the second zone, the introduction of inert gas separates a second portion of the diluent or solvent from the polymer particles and forms a third mixture of inert gas and diluent or solvent vapor. A first portion of the third mixture is withdrawn from the second zone. A second portion of the third mixture is withdrawn from the second zone and used to form the first mixture. The polymer particles containing a third amount of diluent or solvent are withdrawn from the second zone from whence they can be passed to pneumatic conveying means if desired. Preferably, the process is further characterized by countercurrent flow of gases and polymer particles, in which embodiment the process can be conveniently carried out in the above described apparatus.

BRIEF DESCRIPTION OF THE DRAWINGS

The FIGURE schematically illustrates certain features of one embodiment of the present invention.

DETAILED DESCRIPTION OF THE INVENTION

Figure 1:
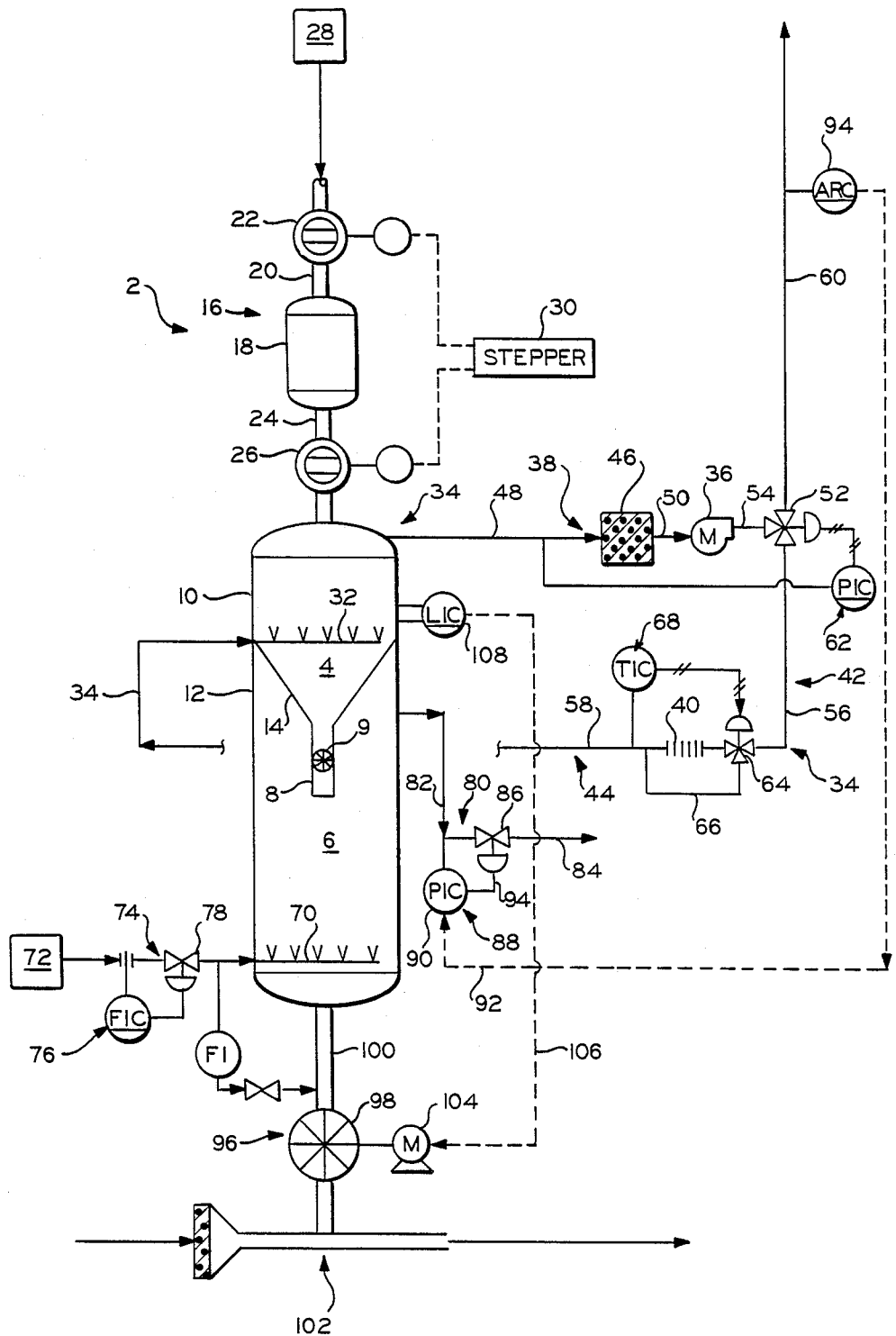

The invention provides an improved process for the removal of vapor from particles. The invention has special utility for the removal of residual diluent or solvent from polymers, especially polymers which are produced or recovered in slurry form. In some cases, the diluent or solvent can be the monomer itself, in whole or in part. Generally, however, the polymer is produced in the presence of liquid hydrocarbon diluents under polymerization process conditions. Suitable diluents include paraffins, preferably containing less than about 12 carbon atoms, monomers, which are generally olefins provided they are liquid at polymerization conditions or soluble in the liquid medium. Naphthenic hydrocarbons having 5 or 6 carbon atoms in the ring, such as cyclohexane, methylcyclopentane, ethylcyclohexane, and the like may also be employed. Other suitable liquid hydrocarbon diluents which can be utilized to conduct particle form polymerization include propane, propylene, n-butane, i-butane, i-octane, and the like.

The polymers to which the present invention is applicable include most any olefinic polymer such as polyethylene, polypropylene, and other polymers and copolymers of 1-olefins having up to about 8 carbon atoms and no branching near the double bond than the four position. The size of the polymer particle is not particularly important in the invention and commonly the polymer to be dried has an aggregate size distribution ranging from fine powder such as about 200 mesh to granular particles as large as ¼ inch or more. Particles larger than a ¼ inch however are generally not preferred because it is more difficult for the diluent or solvent to diffuse from such large particles.

The polymerization reaction to produce such particles can be conducted in most any type of reactor. The two most common types of reactors for producing a slurry of polymer particles in solvent or diluent are the stirred and loop reactors. Of the two, the loop reactor with a settling leg is preferred. One of the advantages of such a reactor is that it provides a settled slurry from the reactor which reduces the amount of solvent which would otherwise have to be removed. Of particular importance are those processes in which ethylene, or mixtures of ethylene with other unsaturated hydrocarbons, are contacted with a suspension of chromium oxide-containing catalysts in a liquid hydrocarbon diluent, the contacting occurring at a temperature such that substantially all of the polymer produced is insoluble in the diluent and in solid particle form, the particles being substantially non-tacky and non-glutenous and suspended in the liquid diluent. Examples of suitable materials for the monomer or comonomer include ethylene, propylene, 1-butene, 1-pentene, 1-hexene, 1-heptene, 1-octene, and 1,3-butadiene. The liquid hydrocarbon diluents which are suitable include paraffins having 3 to 12, preferably 3 to 8 carbon atoms per molecule, such as propane, n-butane, n-pentane, isopentane, n-hexane, isooctane, and the like, most preferably isobutane. The temperature of the polymerization depends upon the hydrocarbon diluent chosen and other factors such as the catalyst and monomer and is generally in the range of about 230° F. and below. The pressure of the reaction is sufficient to maintain the diluent in a liquid phase and is normally about 100 to 700 psia. The reactor effluent, which generally contains 30 to 60 weight percent solids formed by the polymerization process is treated according to the present invention.

In the prior art, the reactor effluent was first flashed to remove a major portion of the solvent and then passed to dryer, such as indirectly heated auger dryers, to remove additional solvent. As a final step, the polymer would be purged with inert gas to remove residual solvent. It was found that a simple purge such as the final devolatilization step was not completely satisfactory. After a dried granular polymer has been purged with rather large volumes of inert gas, a significant amount of solvent may remain with the polymer. This is probably due to two factors: (1) some channeling of the inert gas through the bed reduces the efficiency of the purge and (2) solvent dissolved in solid polymer does not have sufficient driving force and time to diffuse to the surface of the particles and hence into the void passages from which it can be swept out by the purge.

According to certain aspects of the present invention, an apparatus 2 comprises a substantially enclosed first chamber 4 and a substantially enclosed second chamber 6. The substantially enclosed second chamber 6 is preferably associated with the substantially enclosed first chamber 4 so as to gravity feed from the substantially enclosed first chamber 4. Preferably, a standpipe 8 connects the chamber 4 with the chamber 6. More preferably, the chamber 4 and the chamber 6 are formed from an elongated vessel 10 having a generally cylindrical inside wall 12 so that it exhibits a generally circular cross section. A partition 14 divides the inside of the vessel 10 into the first chamber 4 and the second chamber 6. The partition 14 is preferably generally funnel-shaped and depends from the inside wall 12 of the vessel 10 with the mouth of the funnel facing the first chamber 4, the generally frusto conical inside of the funnel defining the lower end of the first chamber 4, and the outside of the funnel defining the upper end of the second chamber 6. The lower portion of the funnel forms the standpipe 8. If desired, a feeder such as a star valve 9 can be positioned in the standpipe 8. Preferably, the vessel 10 is generally vertically oriented so that material in the first chamber 4 will gravity feed into the second chamber 6.

A means 16 for introducing particulate material into the chamber 4 while preventing excessive pressurization of the chamber 4 is provided for introducing particulate material into an upper portion of the substantially enclosed first chamber 4. Preferably, the means 16 comprises a surge vessel 18 having an inlet 20 which is associated with an inlet valve 22 and an outlet 24 which is associated with an outlet valve 26, the outlet 24 being connected with the upper portion of the first chamber 4 when the valve 26 is open. The inlet 20 is connected to a source 28 of polymer particles containing residual solvent or vapor when the valve 22 is open. A stepper 30 is connected to the valve 22 by an appropriate linkage which can be electrical, hydraulic, or pneumatic for example to sequentially open and close the valve 22. The valve 26 is also connected to a stepper, preferably the stepper 30 by suitable linkage so that it also sequentially opens and closes. The stepper 30 is operable to send impulses to the valve 22 and the valve 26 to sequentially open the valve 22, close the valve 22, open the valve 26, and close the valve 26, and then to repeat the sequence. The source 28 of particulate material will generally be combined with fluid, usually gas and residual liquid, and be in an elevated pressure. The surge vessel 18 and associated valve mechanisms provide a means for withdrawing slugs of particulate material from the source 28 without allowing uncontrolled depressurization of zone 28.

A first sparger 32 for the distribution of vapor is positioned in a lower portion of the substantially enclosed first chamber 4. A first conduit means 34 connects the upper portion of the substantially enclosed first chamber 4 with the first sparger 32. Preferably, the conduit means 34 comprises a blower 36 connected to the upper portion of the chamber 4 by a second conduit means 38, a heater 40; a third conduit means 42 connecting the heater 40 and the blower 36 and a fourth conduit means 44 connecting the heater 40 and the sparger 32. The second conduit means 38 preferably comprises a filter 46, a first conduit 48 connecting the filter 46 with the upper portion of the chamber 4, and a second conduit 50 connecting the filter 46 and the blower 36. The third conduit means 42 preferably comprises a three-way valve 52, a third conduit 54 connecting the blower and the three-way valve and a fourth conduit 56 connecting the three-way valve 52 and the heater 40. The fourth conduit means 44 preferably comprises a fifth conduit 58 which connects the heater 40 and the sparger 32. The three-way valve 52 is preferably further connected to a sixth conduit 60, which is routed for proper and safe disposal or further processing as desired. A means 62 is associated with the three-way valve 52 and the conduit 48 by suitable linkages for detecting the pressure in the conduit 48 and manipulating the three-way valve 52 responsively to the thus detected pressure. A preferred means 62 comprises a pressure integral controller.

Further preferably, a second three-way valve 64 is disposed in the fourth conduit 56 between the first three-way valve 52 and the heater 40 and a seventh conduit 66 which by-passes the heater 40 is connected to the three-way valve 64 and the conduit 58. A means 68 is associated with the fifth conduit 58 downstream of the connection between the seventh conduit 66 and the conduit 58 for detecting the temperature in the fifth conduit and manipulating the second three-way valve 64 responsively to the thus detected temperature to control the flows through the heater 40 and the seventh conduit 66. Preferably, the means 68 comprises a temperature integral controller which is associated with the fifth conduit 58 and, via a suitable linkage, with the three-way valve 64.

A second sparger 70 is positioned in a lower portion of the substantially enclosed second chamber 6. The sparger 70 is connected to a source of inert gas 72 by a conduit means 74 which is preferably provided with a means for controlling fluid flow therethrough which in the illustrated embodiment comprises a flow integral controller 76 associated with the conduit means 74 so as to detect fluid flow therethrough and connected by appropriate linkage to a valve 78 positioned in the conduit means 74 so as to control the flow through the conduit means 74. The means 76 is operable to detect the flow through the conduit means 74 and manipulate the valve 78 responsively thereto.

A conduit means 80 is connected to an upper portion of the chamber 6. Preferably, the conduit means 80 comprises a conduit 82, a conduit 84 and a valve 86 connecting the conduit 82 with the conduit 84. The conduit 84 can be sent to the flare or used as fuel. A means 88 for detecting the pressure within the conduit means 82 is associated therewith for detecting the pressure in the conduit means 82 and, via suitable linkage, manipulating the valve 86 responsively to the thus detected pressure. Preferably, the means 88 comprises a pressure integral controller 90 which senses the pressure within the conduit 82, compares the thus detected pressure to a set point signal 92 produced as is hereinafter described and provides a signal 94 which acts upon the valve 86. The signal 92 is received by the means 88 from a means 94 connected with the conduit 60 for analyzing the contents of the sixth conduit 60 and producing the signal 92 which is representative of some portion of the thus detected contents. A suitable means 94 can be any conventional process analyzer for measuring the concentration of a component in a gas stream, for example, a chromatographic analyzer such as an Optichrom 2100 manufactured by Applied Automation, Inc., Bartlesville, Okla. Together the means 94, the means 88, and the linkage 94 provide a means for manipulating the valve 86, which is preferably a motor valve responsively to the concentration of a gaseous component, preferably an inert gas in the conduit 60. A means 96 is connected to a lower portion of the second chamber 6 for metering a particulate material from the lower portion. The means 96 preferably comprises a star valve or the like 98 and a conduit 100 connecting a lower portion of the chamber 6 with the star valve 98. Preferably, the star valve 98 is positioned so as to pass particulate material from the chamber 6 and to a pneumatic conveying device 102. A motor 104 is connected to the star valve 98 and is operable to manipulate the star valve 98. The motor 104 is actuated or controlled in response to a signal 106 which is received from a level detector 108 which is associated with the first chamber 4 to detect the level of particulate material therein and produce the signal 106 which is representative of the thus detected level. A suitable level controller 108 is a radiation type level controller such as is commercially available from Texas Nuclear of Texas.

According to further aspects of the invention, there is provided a process comprising introducing polymer particles and a first amount of diluent or solvent into a first zone, such as the chamber 4, preferably the upper portion thereof. Preferably, the polymer particles undergo a pressure drop as they enter the first zone so that a portion of the diluent or solvent flashes to vapor and can be removed via conduit means 34 for example. The first amount of diluent or solvent will usually be in the range of from about 0.3 to 3 percent by weight of the polymer particles and contained diluent or solvent. The pressure drop undergone by the particles will be to some extent dependent upon the diluent or solvent employed. Where the polymer particle is formed from polyethylene and the diluent or solvent comprises isobutane, the polymer particles enter the first zone from a pressure within the range of from about 17 to about 35 psia. The pressure in the first zone is generally within the range of from about 14.8 psia to about 17 psia.

A first mixture of inert gas and diluent or solvent vapor at a first temperature is introduced into the first zone to evaporate a first portion of the diluent or solvent from the polymer particles and is preferably introduced into a lower portion of the first zone. By using hot gas in the first purge step, the temperature of the polymer and its contained diluent or solvent is raised by some 5° to 50° F. or so, thereby raising the vapor pressure of the solvent and increasing the driving force for solvent to diffuse from the polymer particles. Preferably, the first mixture of inert gas and diluent or solvent is introduced into the chamber 4 and flows upwardly countercurrently to the polymer particles through the standpipe 8. Preferably, the size of the first mixture stream flowing up standpipe 8 is small. It can be controlled by selecting the height of the standpipe 8 or by providing it with a restriction such as the valve 9, which can be a star valve. The polymer particles containing a second amount of diluent or solvent are withdrawn from a lower portion of the first zone, preferably through the standpipe 8 while being contacted countercurrently with the second portion of the third mixture, which forms the first mixture for purging the particles.

A second mixture of inert gas and diluent or solvent vapor is withdrawn from the first zone, preferably from the upper portion thereof such as via conduit 48. A first portion of the second mixture is recycled to the first zone 4 via the means 34 preferably being introduced into a lower portion thereof through the sparger 32. Recirculation of the vapors to the first zone permits the solvent concentration in the inert carrier to build up to a controlled level, generally in the range of 2 to 80 mole percent solvent, usually 2 to 20 mole percent solvent. While the presence of solvent in the inert gas tends to reduce the diffusional driving force for solvent to leave the polymer somewhat, it has the benefit of making it more economical to recover solvent from the gas which is bled off via line 60 for example. As an aid to diluent or solvent removal from the particles contained within the chamber 4, it is preferable to heat the first portion of the second mixture prior to recycling it to the lower portion of the first zone. This is conveniently accomplished in the disclosed invention by passing the portion of the gases to be recycled through the heater 40. Where isobutane is the diluent to be removed from the particles, the second mixture is heated to a temperature within the range of from about 150° F. to about 200° F. prior to recycle to the lower portion of the first zone. The recovery of diluent or solvent from conduit 60 can be carried out by a conventional means such as condensation, absorption, or adsorption. Inert gas from solvent recovery may be recycled to source 72 if desired.

The polymer particles which now have been depleted in diluent or solvent to contain a second amount thereof are introduced into a second zone which can be defined by the chamber 6. Preferably, relatively warm polymer from the first zone passes by gravity through the standpipe 8 into the second zone 6 where it will be purged with fresh inert gas which desirably contains essentially no solvent. A convenient inert gas for this purpose is nitrogen although other types of inert gases can be used if desired. The inert gas is introduced into the second zone to separate a second portion of the diluent or solvent from the polymer particles and form a third mixture of inert gas and diluent or solvent vapor. The inert gas from the source 72 may be at ambient temperature, but optionally it may be preheated by means not shown. When it is preheated, the limiting temperature for preheating the inert gas to either of the purged zones is the softening point of the polymer. However, it must be borne in mind that the softening point of the polymer may be lowered by the presence of dissolved solvent.

A first portion of the third mixture of inert gas and diluent or solvent vapor is withdrawn from the second zone via conduit 82, for example. The flow rate of the first portion of the third mixture is preferably regulated responsively to the concentration of one of diluent or solvent or inert gas being carried by the conduit 60 for diluent or solvent recovery. Generally, the analyzer 94 will be set to maintain a concentration of diluent or solvent vapor in the line 60 at a preselected amount in the range of from about 2 to about 20 mole percent diluent or solvent by providing the signal 92 to manipulate the valve 86 which controls flow through line 82. An important control feature of the invention thus comprises detecting the concentration of at least one of inert gas, diluent or solvent vapor in the second portion of the second mixture and withdrawing the first portion of the third mixture from the second zone 6 responsively to the thus detected concentration.

The second portion of the third mixture is withdrawn from the zone defined by the chamber 6 and used to form the first mixture which preferably flows countercurrently to the polymer particles up the standpipe 8.

Polymer particles containing a third amount of diluent or solvent are then withdrawn from the second zone, preferably from the lower portion thereof via conduit 100 for example. Generally, the third amount of diluent or solvent will be within the range of from about 0.001 to about 0.1 weight percent of the polymer and diluent or solvent withdrawn together from the second zone. Preferably, the polymer particles are withdrawn from the second zone responsively to the detected level of polymer particles in the first zone defined by the chamber 4. This is conveniently carried out according to certain aspects of the invention by detecting a level of polymer particles in the first zone such as by level controller 108 and withdrawing the polymer particles from the second zone responsively to the detected level by manipulating the speed of the motor 104 driving the star valve 98 by the signal 106. The polymer particles can then be picked up by the pneumatic conveying means 102 and conveyed for further processing steps.

Residence time of the polymer in each purge zone is preferably in the range of 30 to 60 minutes, and a height to diameter ratio for the beds of about 5:1 is desirable. Gas flow rate through the beds is preferably in the range of about 5 to about 10 volumes/volume/hour. Purge zone pressures are preferably near but above atmospheric pressure.

The invention is illustrated by the following calculated example.

CALCULATED EXAMPLE

Powdered high density polyethylene containing 1.5 weight percent isobutane solvent is fed from a polymer dryer to a surge vessel operating at 160° F. (71° C.) and 20.7 psia (143 kPa). Polymer flow in and out of the surge vessel is controlled by conventional means such as timer-actuated ball valves or star valve feeders. Polymer flows from the surge vessel at a rate of 20,000 lb/hr of dry polymer (containing 300 lb/hr of isobutane solvent) into the first purge zone operating at 14.8 psia (102 kPa) and 160° to 180° F. (71° to 82° C.). Residence time for the polymer in the first purge zone is about 30 to 60 minutes.

From the first purge zone the polymer passes to the second purge zone which operates at a slightly higher pressure than the first purge zone. Temperature in the second purge zone ranges from about 100° to 180° F. (38° to 82° C.). Polymer residence time in the second purge zone is about 30 minutes. Purged polymer containing no significant amount of solvent passes via a star valve feeder to a transport and storage system. Nitrogen at about 100° F. (38° C.) is introduced into the lower section of the second purge zone via a flow controller and a suitable sparger to obtain good flow distribution of gas through the bed at a rate of 300 lb/hr. A small stream of this nitrogen is also introduced into the polymer discharge line just above the star valve. Purge nitrogen containing 100 lb/hr of isobutane solvent is removed from the second purge zone via a pressure controller which is reset by an ARC on the purge gas removed from the primary purge. Thus the backpressure is controlled at a pressure such that nitrogen passes from the second purge zone to the first purge zone in only sufficient amount to maintain the isobutane solvent concentration in the purge from the first purge zone at an essentially constant concentration. The ARC is any conventional process analyzer for measuring the concentration of a hydrocarbon in a gas stream, for example, a chromatographic analyzer system such as an Optichrom 2100 manufactured by Applied Automation, Inc., Bartlesville, Okla.

Purge gas from the first purge zone at 160° F. (71° C.) and 14.8 psia (102 kPa) is filtered and compressed by a blower to 21 psia (145 kPa) and 200° F. (93° C.). The stream is split by a three-way motor valve manipulated by a pressure controller to maintain a constant back pressure on the first purge zone. Vent gas rate is 833 lb/hr nitrogen containing 200 lb/hr of isobutane solvent vapor; recirculating gas at a rate of 1,500 lb/hr is cooled to 180° F. (82° C.) and 15 psia (103 kPa) and injected into the lower portion of the first purge zone through a gas distributor. Polymer bed level is maintained in the first purge zone by a radiation-type level controller such as is made by Texas Nuclear of Texas.

We claim:
1. Apparatus comprising
(a) a substantially enclosed first chamber;

(b) a means for introducing particulate material into an upper portion of the substantially enclosed first chamber while preventing pressurization of said substantially enclosed first chamber;

(c) a first sparger in a lower portion of the substantially enclosed first chamber;

(d) a first conduit means connecting the upper portion of the substantially enclosed first chamber with the first sparger;

(e) a substantially enclosed second chamber associated with the substantially enclosed first chamber so as to gravity feed therefrom;

(f) a second sparger in a lower portion of the substantially enclosed second chamber;

(g) a conduit means connected to an upper portion of the substantially enclosed second chamber; and (h) a means for metering particulate material from a lower portion of the substantially enclosed second chamber, wherein the first substantially enclosed chamber and the second substantially enclosed chamber are formed from an elongated vessel of generally cylindrical construction having a generally funnel-shaped partition positioned therein depending from the inside wall with the mouth of the funnel facing the first chamber, the inside of the funnel-shaped partition defining the lower end of the first chamber, the outside of the funnel-shaped partition defining the upper end of the second chamber.

2. Apparatus as in claim 1 wherein the means for introducing particulate material into the first chamber without depressurization comprises a surge vessel having an inlet which is associated with an inlet valve and an outlet which is associated with an outlet valve and is connected to the upper portion of the first chamber; and wherein the means for metering particulate material from a lower portion of the second chamber comprises a star valve.

3. Apparatus as in claim 2 further comprising a stepper to sequentially open and shut the inlet valve and open and shut the outlet valve; and a level detector associated with the first chamber to detect the level of particulate therein and manipulate the star valve responsively to the thus detected level.

4. Apparatus as in claim 2 wherein the first conduit means comprises a blower, a second conduit means connecting the upper portion of the first chamber and the blower, a heater, a third conduit means connecting the heater and the blower, and a fourth conduit means connecting the heater and the sparger.

5. Apparatus as in claim 4 wherein the second conduit means comprises a filter, a first conduit connecting the filter and the upper portion of the first chamber, and a second conduit connecting the filter and the blower:

wherein the third conduit means comprises a first three-way valve, a third conduit connecting the blower and the first three-way valve, and a fourth conduit connecting the first three-way valve and the heater, and the fourth conduit means comprises a fifth conduit connecting the heater and the sparger.

6. Apparatus as in claim 5 wherein the conduit means connected to the upper portion of the second chamber comprises a conduit having a motor valve associated therewith, said apparatus further comprising a sixth conduit connected to the first three-way valve and a means connected to the sixth conduit for analyzing the contents of the sixth conduit, detecting the concentration of inert gas therein and manipulating the motor valve responsively to the detected concentration.

7. Apparatus as in claim 5 further comprising a means associated with the first conduit for detecting the pressure therein and manipulating the first three-way valve responsively to the thus detected pressure.

8. Apparatus as in claim 5 further comprising a second three-way valve disposed in the fourth conduit between the first three-way valve and the heater and a seventh conduit connected to the second three-way valve and the fifth conduit bypassing the heater, and a means associated with the fifth conduit between the seventh conduit and the sparger for detecting the temperature in the fifth conduit and manipulating the second three-way motor valve responsively thereto to control flow through the heater and the seventh conduit.

9. Apparatus as in claim 5 further comprising a source of particulate and fluid at elevated pressure connected to the inlet valve, a source of enriched nitrogen connected to the sparger in the second chamber, and a vacuum transfer system connected to the star valve.

* * * * *